United States Patent [19]

Feagins, Jr. et al.

[11] 4,379,334
[45] Apr. 5, 1983

[54] ELECTRONIC PARKING METER

[75] Inventors: Thomas J. Feagins, Jr., Houston, Tex.; Calvin O. Vogt, Tulsa, Okla.

[73] Assignee: Allright Auto Parks, Inc., Houston, Tex.

[21] Appl. No.: 201,545

[22] Filed: Oct. 28, 1980

[51] Int. Cl.$^3$ .............................................. G07C 1/30
[52] U.S. Cl. .................................... 364/467; 235/378; 368/90
[58] Field of Search ................ 364/404, 406–408, 364/464–467; 235/92 T, 378, 381, 385; 179/6.31, 7.1 TP; 368/90; 194/1 N, DIG. 23; 340/51

[56] References Cited

U.S. PATENT DOCUMENTS

| | | | |
|---|---|---|---|
| 3,541,308 | 11/1970 | Ruby | 235/378 |
| 3,575,586 | 4/1971 | Kroll | 235/378 |
| 3,760,160 | 9/1973 | Gieringer et al. | 235/378 |
| 4,034,193 | 7/1977 | Jackson | 364/465 |
| 4,228,519 | 10/1980 | Pfeifer | 340/51 X |
| 4,275,272 | 6/1981 | Mennino, Jr. et al. | 179/7.1 TP |
| 4,310,890 | 1/1982 | Trehn et al. | 364/467 |

OTHER PUBLICATIONS

Advertising Materials for "Attendant II" by Southern Specialties Corporation.
Advertisement of Telxon Corporation for a Hand Held Data Terminal.
Advertisement of P.O.M., Inc. for the "Ticfak" Electronic Multispace Parking Meter.
Advertisement of Kilpatrick Communications and Controls Entitled, "A New Concept in Parking".

Primary Examiner—Jerry Smith
Attorney, Agent, or Firm—Richards, Harris & Medlock

[57] ABSTRACT

An electronic parking meter (20) is disclosed for unattended supervision and sale of space usage for a lot having a plurality of numbered parking spaces. After parking his vehicle, a customer proceeds to the meter (20) and is sequentially instructed to initially enter his identification data through a key pad (36), then enter coins and/or paper currency in any sequence to purchase space usage, then activate a transaction complete button (46), and then take a printed receipt from a strip printer (48). A computer (52) in the meter (20) computes the length of time purchased from the amount of money entered in accordance with the current rate. A cathode ray tube (34) provides visual verification of the identification data entered, and also displays the amount of money paid, the length of time purchased and expiration time. These totals are cumulatively updated as more money is entered. The printer (48) provides a lot status log in response to coded command for efficient lot inventory. There is also disclosed an electronic lot check register (56) for further efficiency in lot inventory, particularly in updating subsequent inventories.

11 Claims, 4 Drawing Figures

U.S. Patent  Apr. 5, 1983  4,379,334
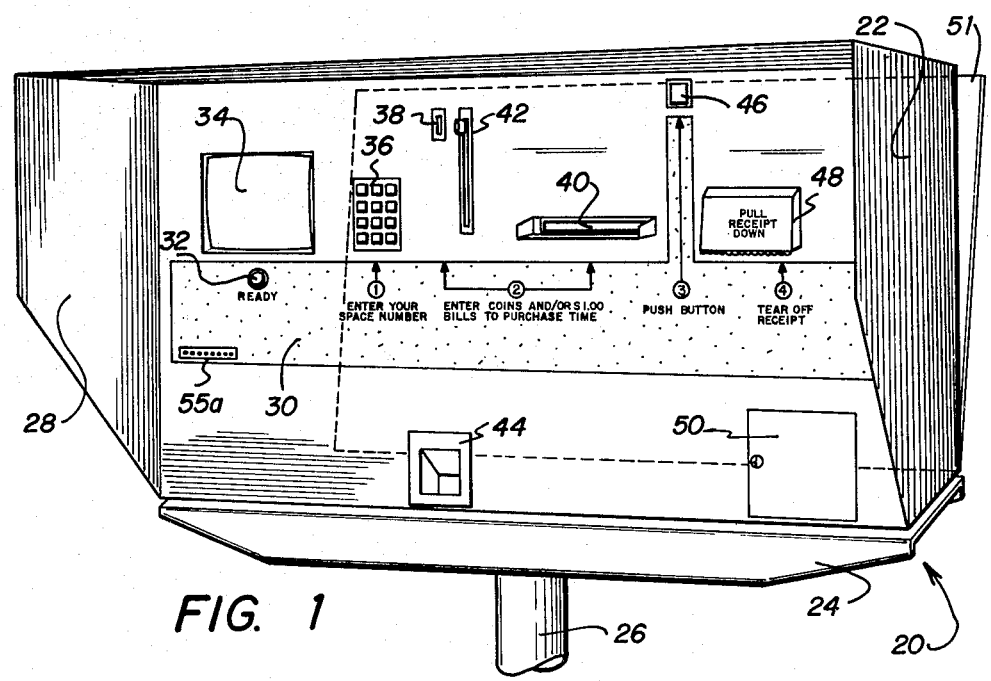
FIG. 1
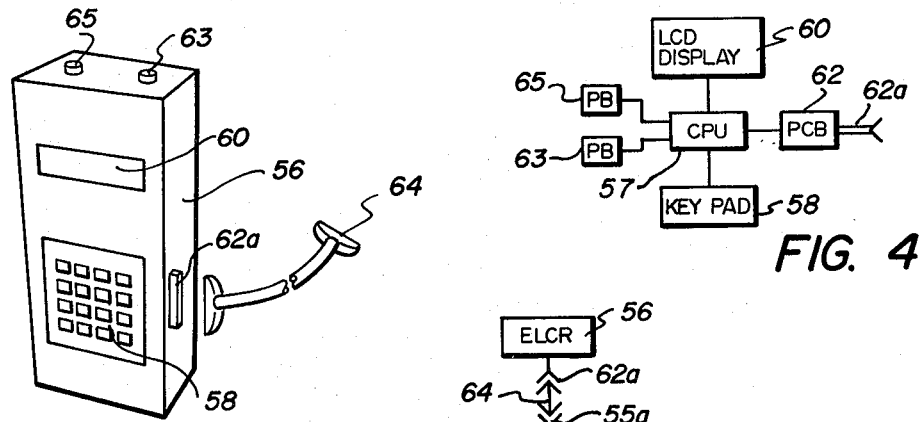
FIG. 2
FIG. 4
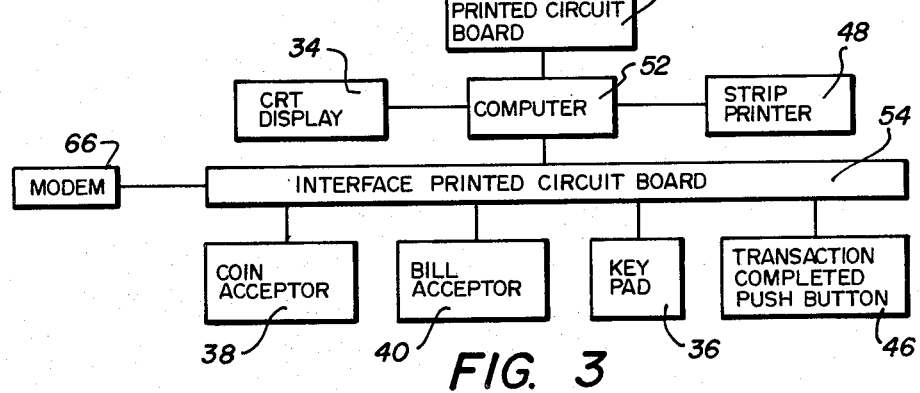
FIG. 3

ELECTRONIC PARKING METER

TECHNICAL FIELD

The present invention relates to parking meters providing unattended sale of space usage for a plurality of parking spaces.

BACKGROUND ART

Parking meters providing unattended sale of space usage or parking time for a plurality of parking spaces are well known and widely used in off-street parking lots for cars and trucks. These meters are mechanical devices in the form of a box having a plurality of numbered slots corresponding to the numbered parking spaces in the lot. The customer drives into the lot and parks in an available parking space. He then proceeds to the parking meter box and deposits money in the numbered slot corresponding to his parking space.

Periodic checks are made to assure that customers are in fact paying for parking. Various techniques are used, and are typically based upon a check sheet which the checker fills out as he inventories the lot and then checks this against the money deposited in the parking meter box. Subsequent checks are made, updating the check sheet and rechecking the box.

While these prior parking meters have been useful for their intended purposes, the present invention relates to improvements thereover.

SUMMARY OF THE INVENTION

The present invention provides an electronic parking meter affording numerous advantages to both the lot operator and to the customer. The invention further provides fast and efficient inventory means which substantially reduces attendance time of the lot checker.

In preferred form, the electronic parking meter of the present invention is mounted in a housing having a front control panel, and installed on a pedestal in a customer accessible location in the parking lot. The customer parks his vehicle in an available parking space and then proceeds to the meter to pre-purchase time. The customer enters his identification number on a key pad, card reader or other input device. A display provides visual feedback information to the customer by displaying the entered identification number for verification by the customer. The customer may erase an erroneously entered identification number. The customer then deposits coins and/or dollar bills to purchase the desired amount of time according to the current parking rate. A small computer within the housing computes the length of time purchased from the amount of money entered, based on the current rate. The display shows the amount of money entered and expiration time. These totals are cumulatively updated for each successive money entry to aid the customer in determining when he has entered enough money to satisfy his parking time requirements.

When the desired amount of time has been purchased, the customer depresses a transaction complete button and a printed receipt is provided for the customer. The receipt includes: the name of the company owning or operating the lot; the lot address; the identification number; the money paid; the time purchased in hours and minutes; the starting time; the expiration time; and the current date. Additional time can be purchased or additional fees can be paid in order to clear up a violation for staying overtime. This is accomplished by repeating the purchase sequence. The computer recognizes the identification number as not fully paid and collects the additional fees.

The receipt printer also prints a lot status log upon coded command from the lot checker. This log lists each identification number, the expiration time, and a symbol if the purchased time has expired. The log is used for inventorying the parking spaces and checking for violators (parkers who have either not paid or whose purchased time has expired). The log includes a blank area for each parking space number. A lot checker may enter vehicle license numbers in these blank areas. For each space in which there has been no activity that day, or in which the purchased time has expired, a line will be printed in the license number area indicating a violator.

With this lot status log the checker walks the lot and tickets any cars parked in spaces which are indicated as expired on the lot status log. The checker can identify the vehicle in each parking space by writing the license number thereof on the lot status log in the blank area for the correspondent parking space number. This information can be used to determine on subsequent checks whether a new vehicle is now parking in the space previously occupied by a different vehicle. On subsequent checks of the lot, the checker can compare the current lot status log with previous logs to determine changes. After checking the lot, any license numbers on the list which were not found on the lot are deleted from the computer.

Upon each customer transaction, the meter eliminates unexpired time of an immediately previous parker and begins a new time frame for the second parker for the particular space number entered.

In an alternate form of the invention, there is provided a hand held electronic lot check register for significantly streamlining lot inventory. This lot check register is plugged into the parking meter during the time that a lot status log is being produced. Information concerning numbered parking spaces which are currently indicated as expired is transferred from the parking meter to the lot check register. The lot check register has a memory with a plurality of storage locations, each corresponding to a designated parking space, for receiving the expiration information. Upon completion of this transfer, the lot check register is unplugged from the parking meter and the physical lot inventory is conducted.

During the inventory, the lot check register is advanced through its memory storage locations. When a storage location is reached which corresponds to a parking space for which time has expired, a special symbol will be displayed indicating the violation. Also during the inventory, the checker can enter license numbers of parked vehicles directly into the lot check register.

A license number is entered into a memory storage location corresponding to the parking space in which the vehicle is parked.

Upon completing the lot inventory with the electronic lot check register, the checker returns to the parking meter and reconnects the lot check register to the parking meter. The stored license numbers are then transferred into the parking meter. Subsequent printouts of the lot status log from the parking meter contain the appropriate license number for each parking space.

The parking meter accumulates a variety of lot operational audit information. A meter provides printout or display of supervisory information such as: number of transactions and accumulated receipts on a daily basis; total transactions and total receipts also on a daily basis. This provides a means of monitoring cash box removal. The attendant removing cash enters a special code via the front panel key pad. The printer then prints a receipt listing the lot identification, date, time, and number of transactions and total receipts since the previous cash removal. This cash box removal receipt provides an audit check for the amount of money turned in by the employee removing the cash.

It should be noted that this invention utilizes a programmable computer. The specific operations and functions of this invention can be changed to adapt the parking meter to many other types of operation.

In accordance with the present invention there is provides a parking meter including a computer to control the meters operation; an information display or output; a keyboard or other data input. In addition there is included a printer for receipts and/or reports; a coin and/or bill accepter and an optional electronic lot inventory device.

BRIEF DESCRIPTION OF THE DRAWINGS

FIG. 1 is a perspective view of the preferred embodiment of an electronic parking meter constructed in accordance with the invention.

FIG. 2 is a perspective view of the electronic lot check register used in conjunction with the parking meter of FIG. 1. FIG. 2 is drawn on a larger scale than FIG. 1.

FIG. 3 is a diagrammatic illustration of the preferred combination employed in the present invention.

FIG. 4 is a diagrammatic illustration of the preferred combination employed in the electronic lot check register.

DETAILED DESCRIPTION

There is shown in FIG. 1 an electronic parking meter, generally designated by the reference character 20. The meter includes a rectangular metal housing 22 mounted on a base 24 which is supported on a pedestal or post 26. The housing has a front enclosure hood 28 extending forwardly therefrom. This hood may have a clear lexan guard (not shown) attached to the top and side front edges thereof to shield the unit from inclement weather and the like. To enable unattended sale of parking time, the housing has a front panel 30 with sequential operating instructions printed thereon.

The front of the housing includes a combination of items accessed by the customer, and responsive to enter and acknowledge purchased parking time. A ready light 32 is provided to indicate a state of readiness of the unit and availability of parking space for sale. A CRT display 34, such as a Motorola Model M1000-155, provides visual feedback information to the customer. A key pad (or other input device) 36, such as a Digitran Model KL0042, is provided for customer entry of input data. A coin accepter 38, such as a Coinco Model, and a dollar bill accepter 40, such as an Ardac Model Mark 5, register monies paid. A coin rejection lever 42 and a coin return slot 44 are also provided. A transaction complete push buttom 46 is provided for signaling the unit that the desired amount of time has been purchased. A strip printer 48, such as an LRC Model 7000, produces customer or lot operator receipts. Such receipts are preferably printed on cash register type paper, such as SWEDA D5R.

The front of the housing further includes a locked storage compartment 50 accessed by authorized personnel. This compartment may be used to store lot status inventory logs generated by the printer in a supervisory mode and/or to store the electronic lot check register, each of which will be described more fully hereinafter. The backwall of the housing is hinged at its bottom edge to provide a rear access door 51 to the interior for service and cash removal. Door 51 is shown partially open in dashed line in FIG. 1.

In operation, the meter is conveniently located on or close to a parking lot consisting of numbered parking spaces or stalls. The customer parks his own vehicle in a parking space and then proceeds to the meter. He first enters through key pad 36 his identification number, e.g. a license number. The numbers are displayed on CRT display 34 as he presses the keys. An erase key is provided to allow the customer to begin again if he should enter an incorrect space number. The customer then inserts coins and dollars bills in any sequence. As the coins and bills are inserted, the CRT will display the parking space number, total money amount paid, amount of time purchased, and the expiration time. When the customer has purchased the desired amount of time, he presses transaction complete push button 46. A customer receipt is then printed by strip printer 48. There is stored in an internal memory the information on space number, amount deposited, the expiration time.

A parking company employee, called a checker, periodically visits the lot to inventory the parking spaces. To check for violators (parkers who have either not paid or whose purchased time has expired), the checker enters a predetermined code through front panel key pad 36. A lot status log is printed by the strip printer 48 on the aforenoted cash register paper in column form listing each parking space number, the starting time of the parker, the amount he paid, and his expiration time. The log also includes a blank area adjacent each space number. The checker can write parked vehicle license numbers in these blank areas. For each space in which there has been no activity that day, or in which the purchased time has expired, a line will be printed in the license number area indicating a violator.

With this lot status log the checker walks the lot and tickets any cars parked in spaces which are indicated as expired on the lot status log. The checker can identify the vehicle in each parking space by writing on the lot status log the license number, or several digits thereof such as the last three. This information can be used to determine on subsequent checks whether a new vehicle is now parking in a space previously occupied by a different vehicle. On subsequent checks of the lot, the checker can compare the current lot status log with previous logs to determine changes.

Upon each customer transaction, the meter erases any unexpired time of the previous parker for the space number entered. A new time frame is begun for each new parker.

A particularly advantageous aspect of the invention is its use of commercially available off-the-shelf building blocks and standard interconnections therebetween. This offers significant cost reduction in implementation. The combination is shown in FIG. 3 and includes a central computer 52, such as an Apple Computer, Inc., Apple II computer board. The combination of components communicating with the central computer 52 is comprised of the commercially available units noted above connected in accordance with accepted practices. An interface printed circuit board 54 is preferred for ease of interconnections of components. Another interface printed circuit board 55 is provided and has a data port 55a.

The electronic parking meter 20 is initially programmed through the use of a plug-in external keyboard or from a magnetic tape player connected to data port 55a. The Apple II computer is programmed from "Apple II Basic Programming Manual," Jef Raskin, Apple Product No. A2L0005X, Apple Computer, Inc., 1978. After initial programming and installation of the parking meter 20, the internal clock of the Apple II computer board is set for month, day, year, hour and minute, using front panel key pad 36. The rate structure is set in accordance with three schedules, day, night, and weekends and holidays, under control of the internal clock. The lot operator or employee sets the time intervals and fees for each of the three schedules, again by means of the key pad 36. Each schedule can have a variety of time intervals and fees, as well as a maximum.

Cash is removed from the meter through the rear access door 51. The person removing the cash enters a given predetermined code through key pad 36. A receipt is printed by printer 48 listing the date, time, lot identification information, and number of transactions and total receipts since the previous cash removal. This cash removal receipt provides an audit check for the amount of money turned in by the employee removing the cash.

Other predetermined codes entered through key pad 36 provide supervisory reports displayed on CRT 34 and/or printed out by printer 48 regarding designated stored information. Typical information that is stored and then displayed and printed are: number of transactions and accumulated receipts during current month; total transactions and total receipts for the previous month; and the data and time of the last ten openings of door 51.

A special feature of the invention is the electronic lot check register 56, FIG. 2. Electronic lot check register 56 is a battery powered, hand held device that is stored inside compartment 50 in meter 20, or is carried by the lot checker from lot to lot. Register 56 provides in combination with meter 20 significantly enhanced efficiency of lot inventory. Vehicle identification information, e.g. license number, is entered into the register 56 during physical lot inventory. This information is then entered into meter 20 where it is stored and printed out on the lot status logs.

Referring to FIGS. 2 and 4, electronic lot check register 56 has a central processing unit (CPU) 57, which preferably includes a microprocessor, such as an RCA 1802, and a memory, such as an INTEL 5101 with 512 bytes of CMOS memory. The lot check register 56 has a key pad 58, such as a Digitran Model KL0042, and an LCD display 60, such as a six digit IEE Polaris Model 1663. Advancement through the memory location is provided by a store and advance button 63, such as a C & K single-pole single-throw pushbuttom switch. A rapid advance button 65, such as another C & K pushbutton is provided for advancing the memory field forward or backward to reach a particular space number. An interface printed circuit board 62 is provided and has a data port 62a for communication with central computer 52 of the meter through removable data link 64 plugged into data ports 55a and 62a.

The lot checker plugs lot check register 56 into the data port 55a of the meter 20. During the time that a lot status log is run, the information concerning numbered parking spaces which are currently indicated as expired is transferred from the meter to the CMOS memory within the lot check register. Upon completion of this transfer, the lot check register is unplugged from meter 20, and the physical lot inventory is conducted.

During this inventory, the checker enters the license number (or seveal digits therefrom) of each vehicle in the appropriate numbered space. This function is controlled by button 63. When this button is depressed, a space number will be displayed. When the button is released, the checker then enters the license plate number of the vehicle in that space. Redepressing the store and advance button 63 puts this license number into memory and displays the next sequential space number. The checker moves through the lot, depressing the button, verifying the space number, entering the license number and storing same. When a space number is reached in the sequential routine for which time has expired, a symbol is displayed indicating the violation. Rapid advance button 65 advances the field forward or backward to reach a particular space number. Buttons 63 and 65 are connected to pins on the microprocessor which are continuously scanned. Button depression pulls a respective pin low which, upon interrogation during the scan, provides a YES for branching to perform advancement of the memory address pointer. Depending on lot size, the lot check register is configured to provide only for the entering of specific numerals or a special symbol indicating a letter for the license digit. For larger lots, the key pad size and memory capacity are expanded to allow full alpha-numeric capability.

Upon completing the lot inventory with the lot check register, the checker returns to the meter 20 and reconnects the lot check register thereto through data link 64. License numbers stored in the lot check register are then transferred into meter 20. Subsequent printouts of the lot status log from printer 48 contain the appropriate license number for each parking space.

In a further alternative, a standard telephone modem 66 is incorporated with the combination of FIG. 3 for remotely accessing the meter. With this modem and a remote printer, a lot status log is printed out at a remote location via telephone, as well as any of the supervisory reports which are available.

In addition to parking lots for automobiles and trucks, the invention may be used in boat marinas, airfield parking lots for small planes, and the like.

It is recognized that various modifications are possible within the scope of the appended claims.

We claim:

1. An electronic parking meter and lot check register in combination providing unattended supervision and sale of space usage for a plurality of parking spaces and efficient lot inventory comprising:
   (a) an electronic parking meter comprising:
   computer means including a memory;
   identification means for customer entry of identification data;
   cash acceptance means receiving and storing money entered therein by the customer;
   display means visually displaying the amount of money and identification data entered by the customer through said identification means; and (b) an electronic lot check register for providing a lot status log and having identification means, memory and display, and a data link for connection to said electronic parking meter for transfer of information from said parking meter to said lot check register such that during lot inventory said display of said lot check register provides a visual indication of a violation, said identification means of said lot check register providing entry of parked vehicle identification information for each parking space for storage in said memory of said lot check register for transfer thereof to said parking meter through said data link for updating a subsequent lot status log to contain current parked vehicle identification information for each parking space.

2. The invention according to claim 1 wherein said lot status log has a blank area for each parking space number for entry of identification information therein and wherein said electronic parking meter includes a printer that provides a printout of said identification information in said blank area and further prints a violation mark in said blank area for each parking space in which there has been no activity for a predetermined time or in which the purchased time has expired.

3. The invention according to claim 1 further including:
   transaction complete means activated by the customer after purchasing the length of parking time desired and storing in said computer means the identification data and amount of money entered; and
   printer means printing a customer receipt for each transaction, and printing a lot status log listing each identification data and expiration time, upon entry through said identification means of a predetermined code by a lot checker.

4. An electronic parking meter providing unattended supervision and sale of space usage for a plurality of parking spaces comprising in combination:
   a housing;
   identification means in said housing for customer entry of space and customer personal identification data;
   display means in said housing for visually displaying the identification data entered by the customer through said identification means for verification thereof;
   coin acceptance means in said housing;
   paper currency acceptance means in said housing;
   transaction complete means in said housing for activation by the customer after purchasing the length of parking time desired;
   printer means in said housing for printing a customer receipt for each transaction; and
   central computer means in said housing interconnected with said identification means, said display means, said coin acceptance means, said paper currency acceptance means, said transaction complete means, and said printer means, and wherein said computer responds to a predetermined code entered into the central computer means through said identification means to actuate said printer to print a lot status log listing each parking space, and for each space the starting and expiration time for the sale of such space.

5. The invention according to claim 4 further comprising a hand held electronic log check register having a memory, and a removable date link for interconnection of said lot check register with said central computer means for data transfer therebetween.

6. The invention according to claim 4 wherein said housing includes a lockable storage compartment for storing said lot status log.

7. An electronic parking meter providing unattended supervision and sale of space usage for a plurality of parking spaces comprising in combination:
   a housing having a front panel;
   readiness indication means providing a visual indication of a state of readiness for the sale of space usage to a customer;
   identification means on said front panel for customer entry of space and customer personal identification data;
   display means on said front panel for visually displaying the identification data entered by the customer through said identification means for verification thereof;
   sequential instruction means on said front panel instructing the customer to initially enter the identification data through said identification means;
   coin acceptance means on said front panel;
   paper currency acceptance means on said front panel;
   said sequential instruction means secondly instructing the customer to enter coins and/or paper currency to purchase space usage;
   transaction complete means on said front panel for activation by the customer after purchasing the space usage desired;
   said sequential instruction means thirdly instructing the customer to activate said transaction complete means;
   printer means on said front panel for printing a customer receipt for each transaction;
   said sequential instruction means fourthly instructing the customer to take said receipt; and
   central computer means interconnected with said readiness indication means, said identification means, said display means, said coin acceptance means, said paper currency acceptance means, said transaction complete means and said printer means, and wherein said computer responds to a predetermined code entered into the central computer means through said identification means to actuate said printer to print a lot status log listing each parking space, and for each space the starting and expiration time for the sale of such space.

8. An electronic parking meter providing unattended supervision and sale of space usage for a plurality of parking spaces comprising in combination:
   a housing;
   identification means in said housing for customer entry of identification data;
   display means in said housing for visually displaying identification data entered by the customer through said identification means for verification thereof;
   coin acceptance means in said housing;
   paper currency accepting means in said housing;
   transaction complete means in said housing for activation by the customer after purchasing the length of parking time desired;
   printer means in said housing for printing a customer receipt for each transaction;
   central computer means in said housing interconnected with said identification means, said display means, said coin acceptance means, said paper currency means, said transaction complete means, and said printer means; and a hand-held electronic lot check register having a memory and a removable data link for interconnection of said lot check register with said central computing means for data transfer therebetween, and wherein said printer means prints a lot status log listing each entry of identification data and expiration time, upon entry through said identification means of a predetermined code by a lot checker, said expiration time information being transferred to said electronic lot check register upon connection thereof through said data link to said central computer means, said electronic lot check register having display means for indicating violation information to the lot checker during inventory after disconnection of said data link, said lot check register further having identification means for entry of parked vehicle identification information by said lot checker during said lot inventory for transfer to said central computer means upon reconnection of said data link for updated printing of vehicle identification information by said printer means on subsequent printouts on subsequent lot status logs.

9. A lot check register for interconnection to and use with an electronic parking meter for supervision of the sale of space usage for a plurality of parking spaces, comprising:

computer means including a memory;

a key pad for entry of parked vehicle identification information for each parking space for storage in the memory of said computer means;

display means visually displaying data from said computer means and data entered through said key pad and a visual indication of a violation; and interface means for establishing a communication link between said computer means and the electronic parking meter to transfer into the memory of said computer means information concerning numbered parking spaces from said electronic parking meter and upon completion of a lot inventory transferring identification data to the electronic parking meter for updating a subsequent lot status log to contain current parked vehicle identification information for each parking space.

10. A lot check register as set forth in claim 9 wherein said key pad means includes a store-in-advance button for transferring entered identification data from the key pad to the memory of said computer.

11. A lot check register as set forth in claim 10 wherein said key pad means includes a rapid advance button for advancing the memory field forward or backward to reach a particular parking space number.

* * * * *

UNITED STATES PATENT AND TRADEMARK OFFICE
CERTIFICATE OF CORRECTION

PATENT NO. : 4,379,334
DATED : April 5, 1983
INVENTOR(S) : Thomas J. Feagins, Jr. et al It is certified that error appears in the above—identified patent and that said Letters Patent is hereby corrected as shown below:

Column 3, line 2, "A" should be --The--.

Coumn 3, line 19, "provides" should be --provided--.

Colume 5, line 40, "data" should be --date--.

Column 6, line 12, "seveal" should be --several--.

Signed and Sealed this

Thirteenth Day of September 1983

[SEAL]

Attest:

GERALD J. MOSSINGHOFF

Attesting Officer *Commissioner of Patents and Trademarks*